(12) United States Patent
Rhodes et al.

(10) Patent No.: US 7,452,173 B2
(45) Date of Patent: Nov. 18, 2008

(54) BUILDING TRANSPORT DEVICE

(75) Inventors: James Rhodes, Las Vegas, NV (US);
Matthew Priddy, Las Vegas, NV (US);
Aidan J. Bradley, Westlake Village, CA (US); Jeff Anderson, Saugus, CA (US);
Gabriel T. Manville, Santa Rosa, CA (US); Kevin T. Parent, Santa Barbara, CA (US); Frank K. Weigand, La Canada, CA (US)

(73) Assignee: Custom Quality Homes, L.L.C., Las Vegas, NV (US)

( * ) Notice: Subject to any disclaimer, the term of this patent is extended or adjusted under 35 U.S.C. 154(b) by 0 days.

(21) Appl. No.: 11/431,196

(22) Filed: May 9, 2006

(65) Prior Publication Data
US 2007/0264110 A1 Nov. 15, 2007

(51) Int. Cl.
*E04G 21/14* (2006.01)
(52) U.S. Cl. .................................. 414/12; 414/461
(58) Field of Classification Search ................. 414/458, 414/10, 12; 410/44; 52/143; 280/504; 180/209
See application file for complete search history.

(56) References Cited

U.S. PATENT DOCUMENTS

| | | | |
|---|---|---|---|
| 1,362,069 A | 12/1920 | Witzel | |
| 2,287,229 A | 6/1942 | Carpenter | |
| 3,574,920 A | 4/1971 | Stirling et al. | |
| 3,794,196 A * | 2/1974 | Terho et al. ................. | 414/458 |
| 3,805,365 A | 4/1974 | Ashby | |
| 3,817,401 A * | 6/1974 | Becker ......................... | 414/12 |
| 3,820,216 A | 6/1974 | Van der Lely | |
| 3,834,110 A | 9/1974 | Vercelletto | |
| 3,890,688 A | 6/1975 | Van der Lely | |
| 3,897,620 A | 8/1975 | Wright | |
| 3,958,320 A | 5/1976 | Van der Lely | |
| 3,962,773 A | 6/1976 | Van der Lely | |
| 3,994,060 A | 11/1976 | van der Lely et al. | |
| 4,000,588 A | 1/1977 | Van der Lely | |
| 4,015,375 A | 4/1977 | Lindsay | |
| 4,187,659 A | 2/1980 | Blachura | |

(Continued)

FOREIGN PATENT DOCUMENTS

CA  2417039  7/2004

(Continued)

OTHER PUBLICATIONS

Robert Steuteville, "New housing manufacturing system tried at TND," *New Urban News*, Jun. 2006.

(Continued)

*Primary Examiner*—Saúl J Rodríguez
*Assistant Examiner*—Joshua I Rudawitz
(74) *Attorney, Agent, or Firm*—Bell, Boyd & Lloyd LLP

(57) ABSTRACT

The present invention relates to a transport device for transporting a building. The device includes a first support structure, the first support structure having at least four wheels capable of individual rotation about a vertical axis and a second support structure, the second support structure having at least four wheels capable of individual rotation about a vertical axis. The first support structure and the second support structure are configured to couple together to support and transport the building.

21 Claims, 12 Drawing Sheets

U.S. PATENT DOCUMENTS

| | | | |
|---|---|---|---|
| 4,207,714 A | | 6/1980 | Mehls |
| 4,443,992 A | | 4/1984 | Shechter |
| 4,450,617 A | | 5/1984 | Dillon |
| 4,501,098 A | | 2/1985 | Gregory |
| 4,546,530 A | | 10/1985 | Rizk |
| 4,573,292 A | | 3/1986 | Kaufman et al. |
| 4,573,302 A | | 3/1986 | Caretto |
| 4,807,407 A | | 2/1989 | Horn |
| 4,939,655 A | * | 7/1990 | Majeed et al. ................ 701/37 |
| 5,028,072 A | | 7/1991 | Lindsay |
| 5,402,618 A | | 4/1995 | Biffis et al. |
| 5,417,539 A | * | 5/1995 | van der Wal ................ 414/458 |
| 5,826,379 A | | 10/1998 | Curry |
| 5,884,437 A | | 3/1999 | Olsen |
| 6,000,192 A | | 12/1999 | Cohen et al. |
| 6,027,295 A | * | 2/2000 | Geppert et al. ................ 414/12 |
| 6,067,771 A | | 5/2000 | Blankenship |
| 6,253,504 B1 | | 7/2001 | Cohen et al. |
| 6,272,810 B1 | | 8/2001 | Ingram et al. |
| 6,443,687 B1 | * | 9/2002 | Kaiser ........................ 414/685 |
| 6,503,025 B1 | | 1/2003 | Miller |
| 6,625,937 B1 | | 9/2003 | Parker et al. |
| 6,651,393 B2 | | 11/2003 | Don et al. |
| 6,832,143 B2 | * | 12/2004 | Trudeau et al. ............... 701/37 |
| 6,846,144 B2 | * | 1/2005 | Justice ........................ 414/12 |
| 6,920,721 B2 | | 7/2005 | Johns et al. |
| 7,165,370 B1 | * | 1/2007 | Wolfe ........................ 52/589.1 |
| 2002/0007605 A1 | | 1/2002 | Cohen et al. |
| 2003/0167725 A1 | | 9/2003 | Long |
| 2004/0160084 A1 | | 8/2004 | Mason et al. |
| 2005/0235581 A1 | | 10/2005 | Cohen et al. |

FOREIGN PATENT DOCUMENTS

| | | |
|---|---|---|
| CA | 2421475 | 7/2004 |
| CA | 2428174 | 7/2004 |
| CA | 2430637 | 7/2004 |
| CA | 2436463 | 7/2004 |
| CA | 2436767 | 7/2004 |
| CA | 2449159 | 7/2004 |
| JP | 3055332 | 11/1991 |
| WO | 2004/065727 | 5/2004 |

OTHER PUBLICATIONS

Hal Carlson, "Tri-Trend Inc.'s 'Environ-System': Colorado Home Manufacturer Brings the Plan to the Site", *Automated Builder*, Sep. 1991.

Industrialized Housing Portrait, *Automation in Housing*, Dec. 1973/Jan. 1974.

International Builders Show 2002 Product Review, *Automated Builder*, Edition 369, Mar. 2002.

Dan O. Carlson, Unpublished article covering Porta-Kamp Construction, Inc. Process, "Celebrating 50 years of Versatility: With Successful Building Solutions from the Arctice to the Desert Worldwide, Porta-Kamp Now Sets Its Sights on Solving American Inner City Housing Problems".

"The New Building Block", Editorial, *Progressive Architecture*, Oct. 1964.

George Leon, "The Economics and Management of System Construction", pp. 11-12, Longman Group Limited, 1971.

Miles L. Colean, "Organizing the Construction Industry for Mass Markets", pp. 1-4, The Construction Industry Information Committee of the Producers' Council, Inc., 1949.

Thomas E. Nutt-Powell, "Manufactured Homes, Making Sense of a Housing Opportunity", pp. 14, Auburn House Publishing Company, 1982.

*House & Home* Publication, Dec. 1965.

Vernon D. Swaback, "Production Dwellings: An Opportunity for Excellence", pp. 321-323, *Land Economics*, vol. XLVII, No. 4, Nov. 1971.

Monica Elliott, "Adaptable Architecture", pp. 29-33, *Industrial Engineer*, Sep. 2005.

Thomas E. Nut-Powell, "The house that Machines built: house manufacturing reduces costs. Further gains require improved management and more rational building regulations", vol. 88, *Technology Review* Nov. 1985.

Michael O'Brien, "Industrializing the Residential Construction Site", HUD Office of Policy Development and Research, Jul. 2000.

Sara Hart, "The House of the Future Has Arrived", p. 149, *Building Science*, vol. 190, No. 7, Jul. 2002.

"On-Site House Factory" article, PATH.

"Joint Venture for Affordable Housing Information Kit", Accession No. 2848, Jan. 1, 1982.

"Technology Road Map: Whole House and Buliding Process Redesign, 2003 Progress Report", PATH, May 2004.

Alan S. Oser, "Perspectives; Modulars; The Navy Yard hosts a Housing Factory", *The New York Times*, Oct. 14, 1990.

Witold Rybczynski, "Architecture View: With Wear and Tear, Habitat Has Become a Home", *The New York Times*, Arts and Leisure Desk, Section 2, p. 28, col. 1, Aug. 5, 1990.

Michael deCourcy Hinds, "Habitat: A Lonely Leader in Housing", *The New York Times*, Real Estate Desk, Section 8, p. 1, col. 2, Jul. 26, 1987.

* cited by examiner

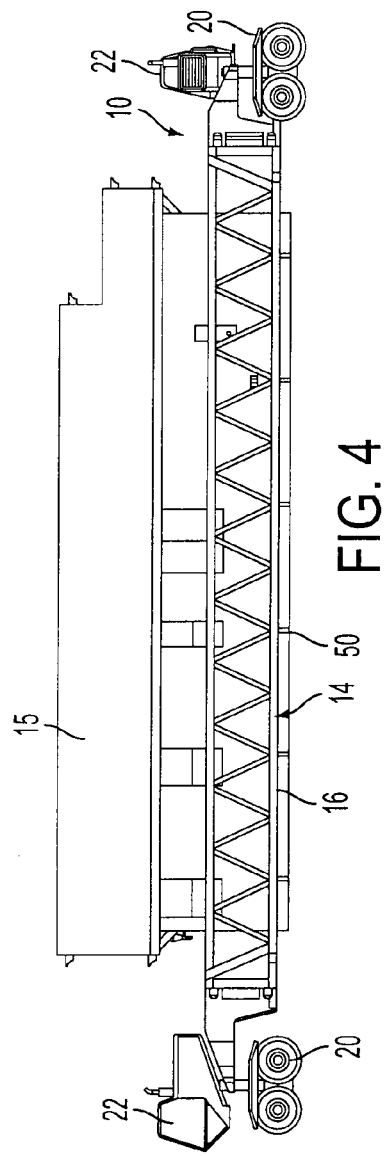
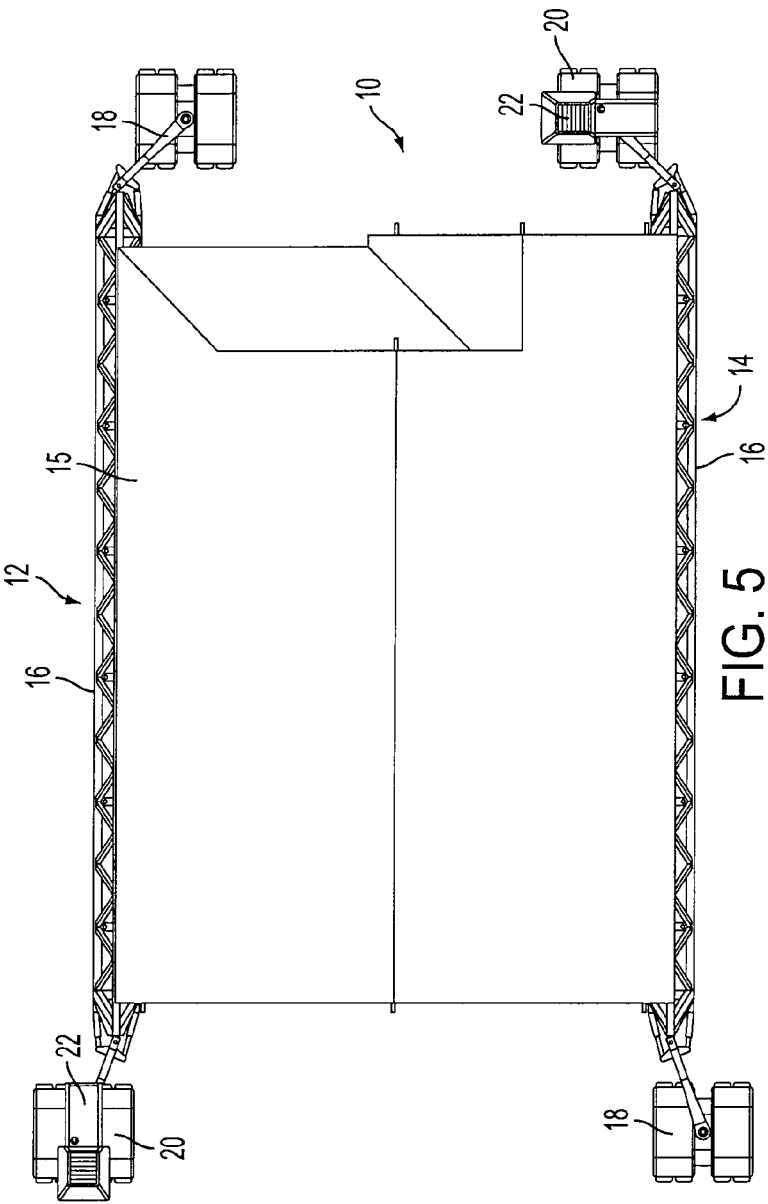

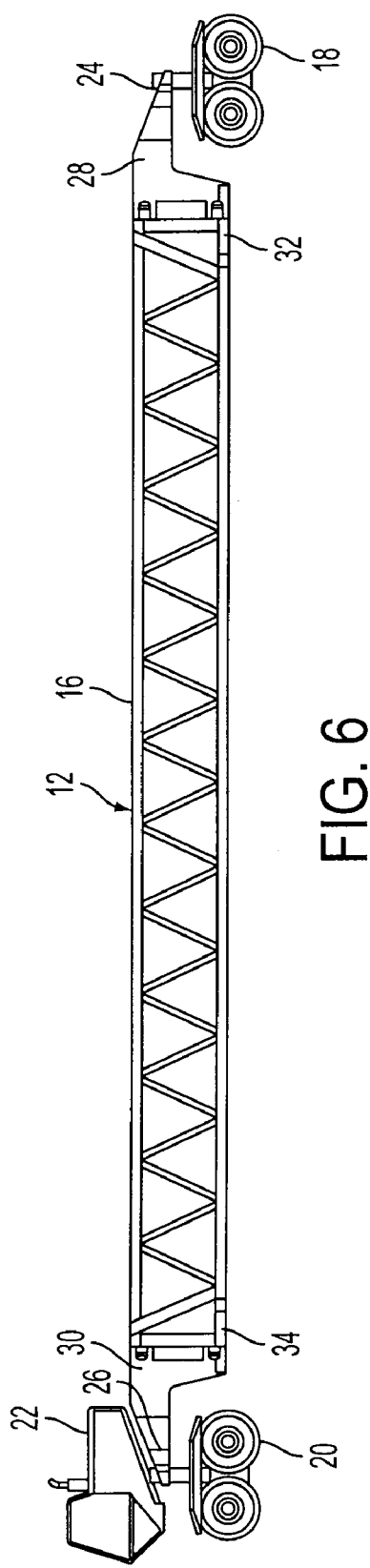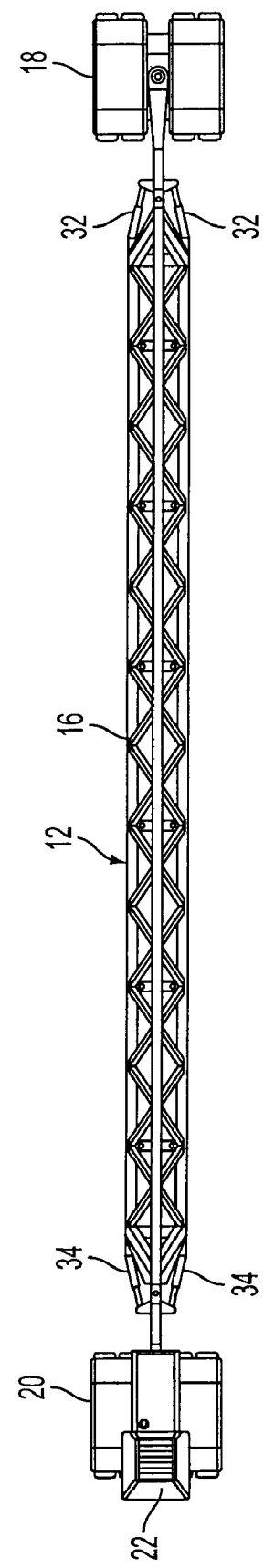

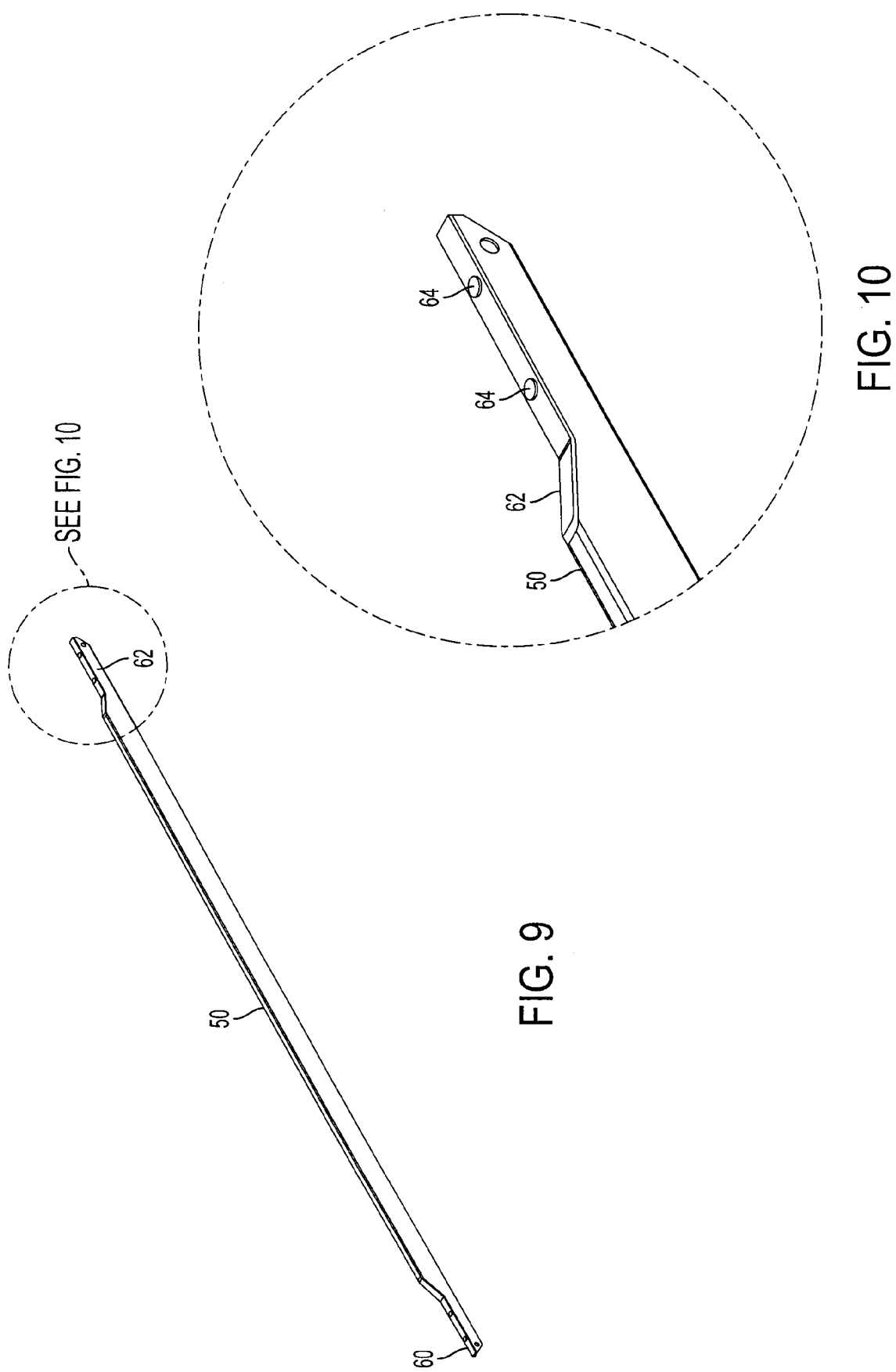

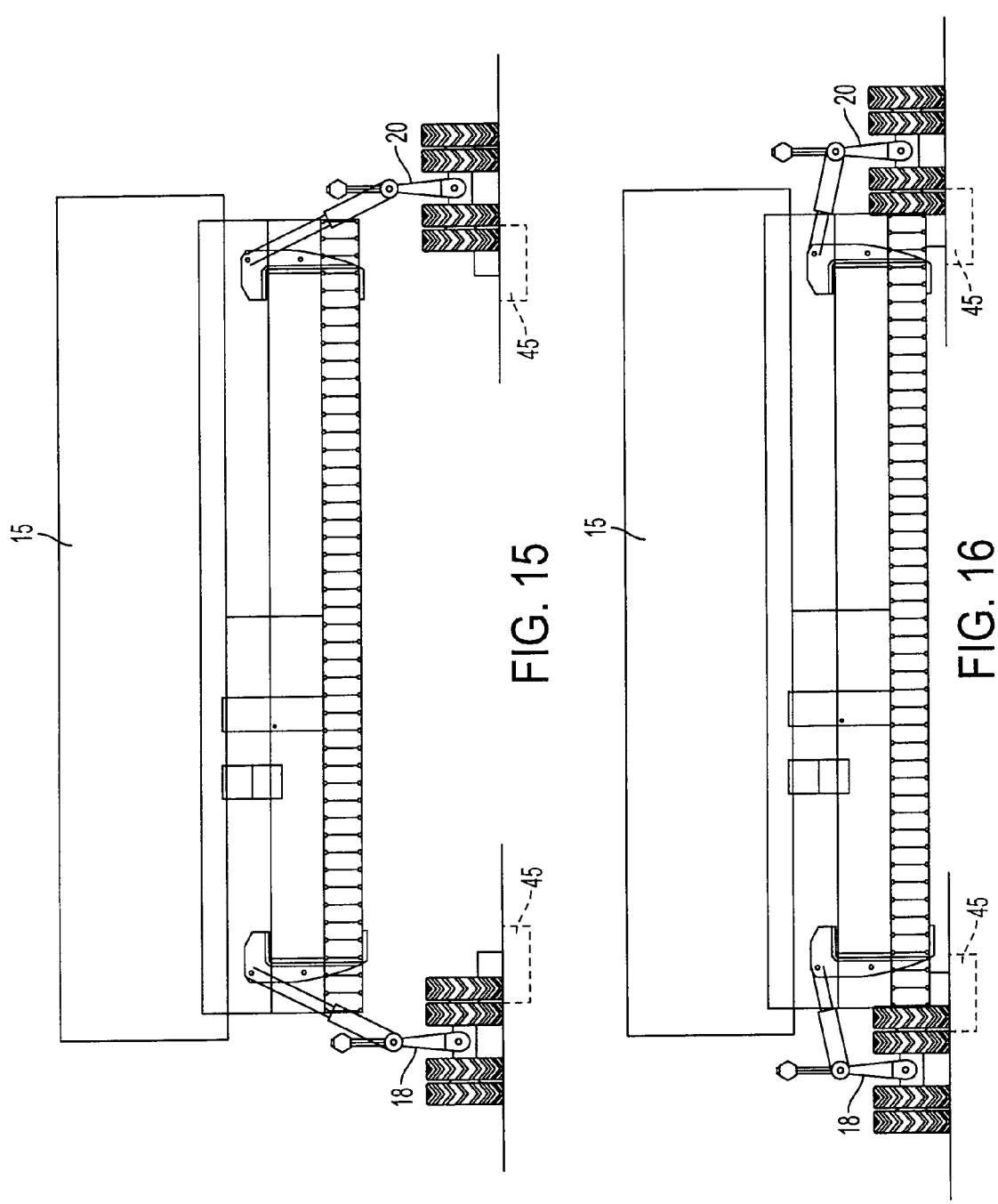

BUILDING TRANSPORT DEVICE

BACKGROUND

The prior art is generally directed to transporting a building or house by a flat bed delivery device, such as a truck or other device. The prior art delivery devices generally attempt to locate the buildings or houses onto or adjacent a foundation or other structure prior to the building or house being unloaded from the transporter, to simplify the adjustments necessary to properly position the house upon the foundation.

The house transporters in the prior art do not readily allow the house to be conveniently adjusted for levelness, height, and angular and horizontal alignment prior to the house being removed from the transporter.

SUMMARY

One embodiment of the present invention relates to a transport device for transporting a building. The device includes a first support structure, the first support structure having at least two wheels capable of individual rotation about a vertical axis and a second support structure, the second support structure having at least two wheels capable of individual rotation about a vertical axis. The first support structure and the second support structure are configured to couple together to support and transport the building.

Another embodiment of the present invention relates to a transport device for transporting a building. The transport device includes a first self propelled transport vehicle, the first self propelled transport vehicle having at least two wheels capable of individual rotation about a vertical axis, each of the wheels driven by a motor and a second self propelled transport vehicle, the second self propelled transport vehicle having at least two wheels capable of individual rotation about a vertical axis, each of the wheels driven by a motor. The first self propelled transport vehicle and the second self propelled transport vehicle are configured to couple together and communicate such that the building is supported and capable of being transported.

Another embodiment of the present invention relates to a method of transporting a building. The method includes the steps of coupling the building to a first transport vehicle and a second transport vehicle, such that the building is positioned at least partially between the first transport vehicle and the second transport vehicle, moving the building to a desired location, positioning the building over the desired location, lower the building on to the desired location, and decoupling the building from the first transport vehicle and the second transport vehicle.

Additional features and advantages are described herein, and will be apparent from, the following Detailed Description and the figures.

BRIEF DESCRIPTION OF THE FIGURES

FIG. 4 is a side view of the vehicle and building of FIG. 3;

FIG. 5 is a top view of the vehicle and building of FIG. 4;

FIG. 6 is a side view of one of the vehicles illustrated in FIG. 1;

FIG. 7 is a top view of the vehicle of FIG. 6;

FIG. 9 is a top perspective view of one of the beams shown in FIG. 2 for coupling the two vehicles together;

FIG. 10 is an enlarged view of one end of the beam of FIG. 9;

FIG. 15 is a schematic side view representation of the vehicle of FIG. 14; and

FIG. 16 is a schematic side view representation of the vehicle of 15 lowering the building onto the existing foundation.

DETAILED DESCRIPTION

Figure 1:
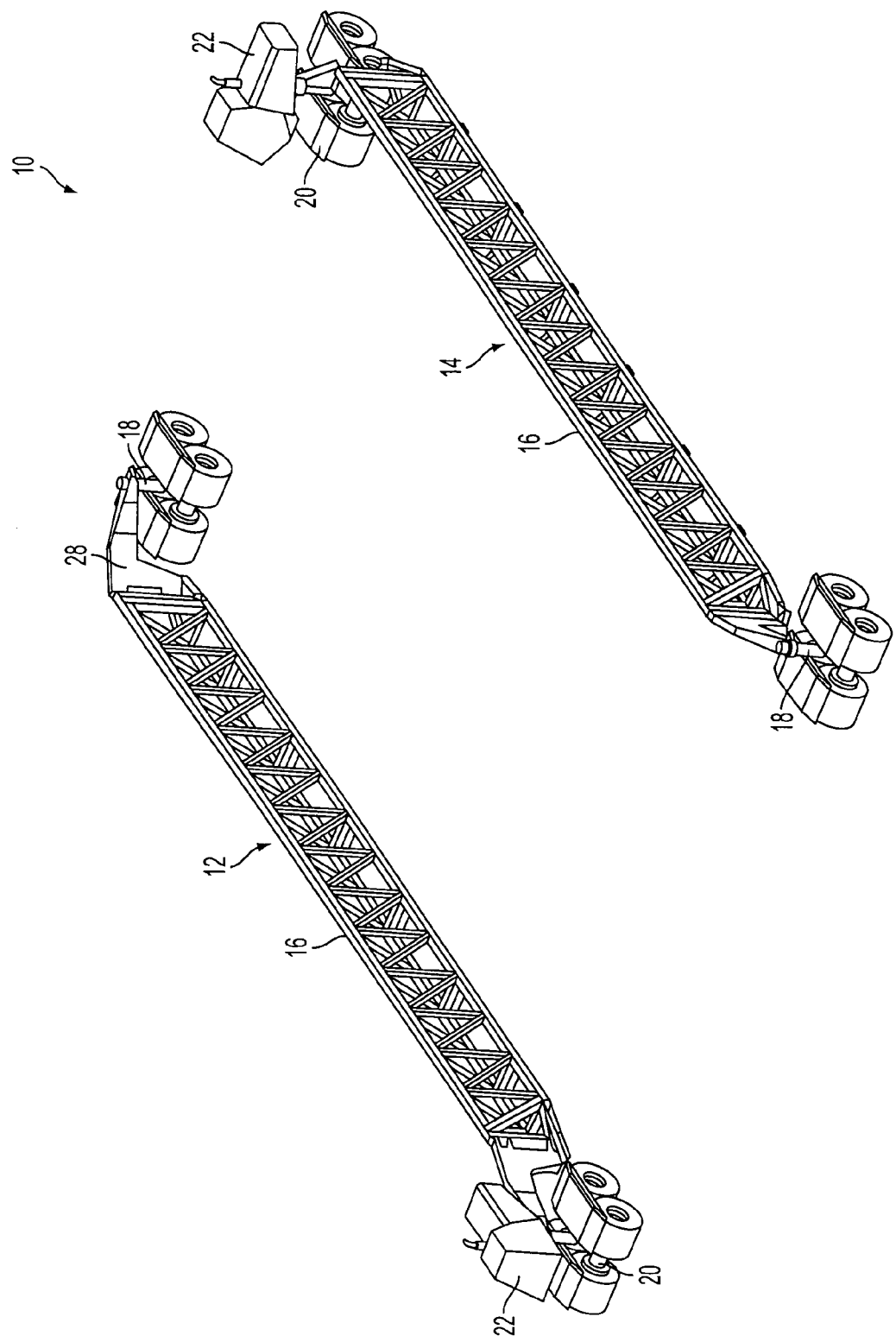
FIG. 1 illustrates two separate vehicles that can connect together and move buildings according to one embodiment of the present invention.
Figure 2:
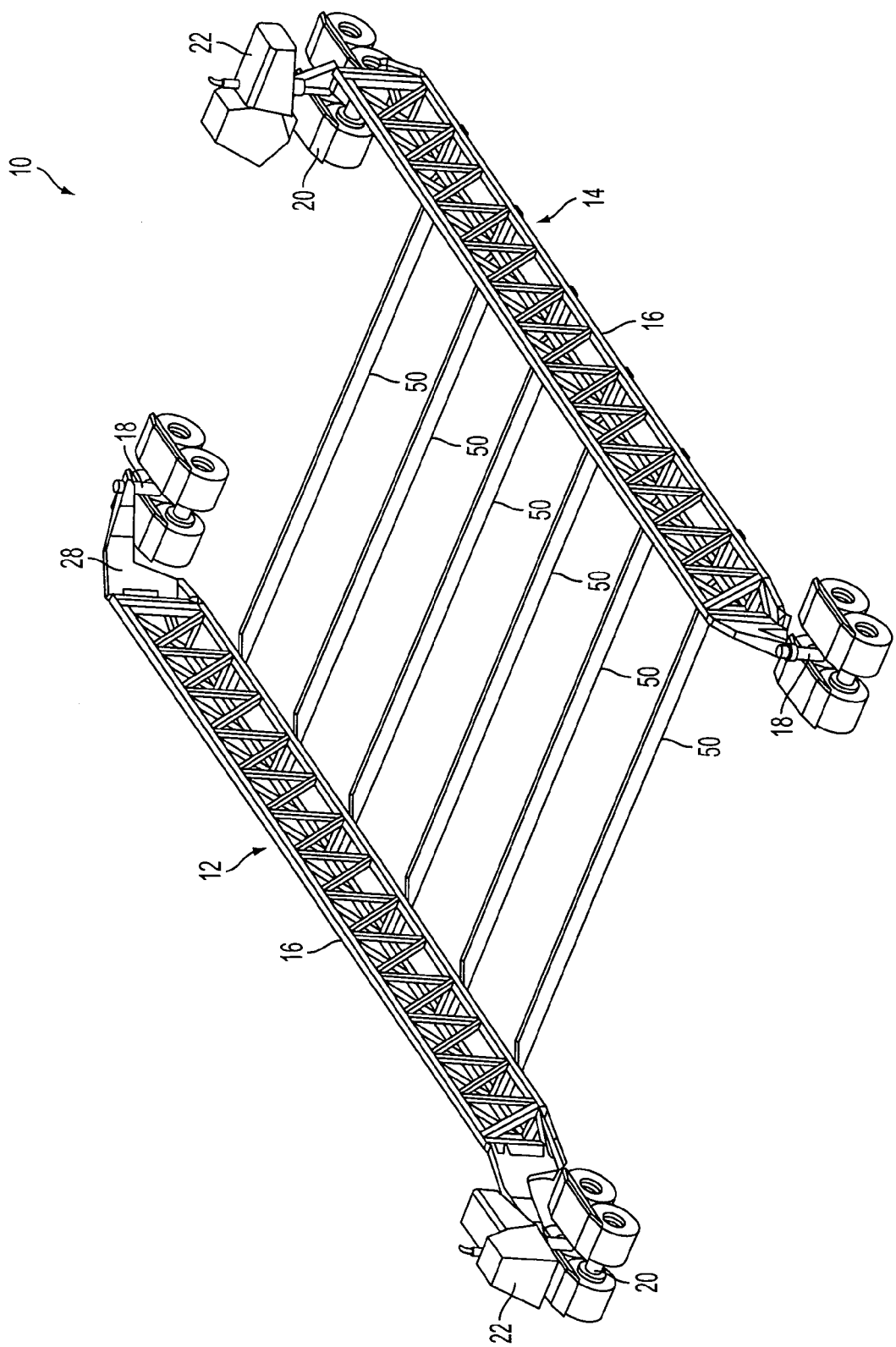
FIG. 2 is a top perspective view of the vehicles of FIG. 1 connected together using beams.

FIGS. 1-11 illustrate a building transport vehicle 10 according to the present invention. The transport device is configured to transport any suitable building. Building is defined as a house or other large semi-rigid payload. As shown in FIG. 1, the transport vehicle generally consists of a first independent transport vehicle or support structure 12 and a second independent transport vehicle or support structure 14; however, the vehicle 10 can include any number of suitable vehicles. Preferably, vehicles 12 and 14 couple together in any suitable manner and are configured to transport a house or building 15, as shown in FIG. 2-5.

Preferably, the first and second vehicles are substantially similar and can either operate alone or in combination. Therefore, the description of one vehicle is applicable to both vehicles 12 and 14; however, the vehicles can each be designed in any suitable manner and do not necessarily need to be substantially similar. When operating in combination, the vehicles preferably are coupled together using beams 50 (or any other suitable means) and are preferably in electrical communication. One of the vehicles preferably is the dominant vehicle and will control the overall operation (i.e., the vehicles operate in a master-slave relationship); however, it is not necessary for each vehicle to be able to operate independently nor is it necessary for one of the vehicles to be the dominant vehicle.

As shown in FIGS. 6 and 7, each vehicle preferably includes a truss 16, a first bogie 18, a second bogie 20 and a control station 22. The truss 16 is preferably manufactured from welded tubes, but can be any suitable design and/or configuration. Each truss is generally about 60 feet long, about 44 inches wide, about 92 inches high and weighs approximately 2000 pounds; however the truss can have any suitable dimensions and/or weight as appropriate for the building size and weight. Preferably truss 16 is designed and configured to provide minimal loaded deflection and cope with torsional load when the bogies are offset.

Figure 8:
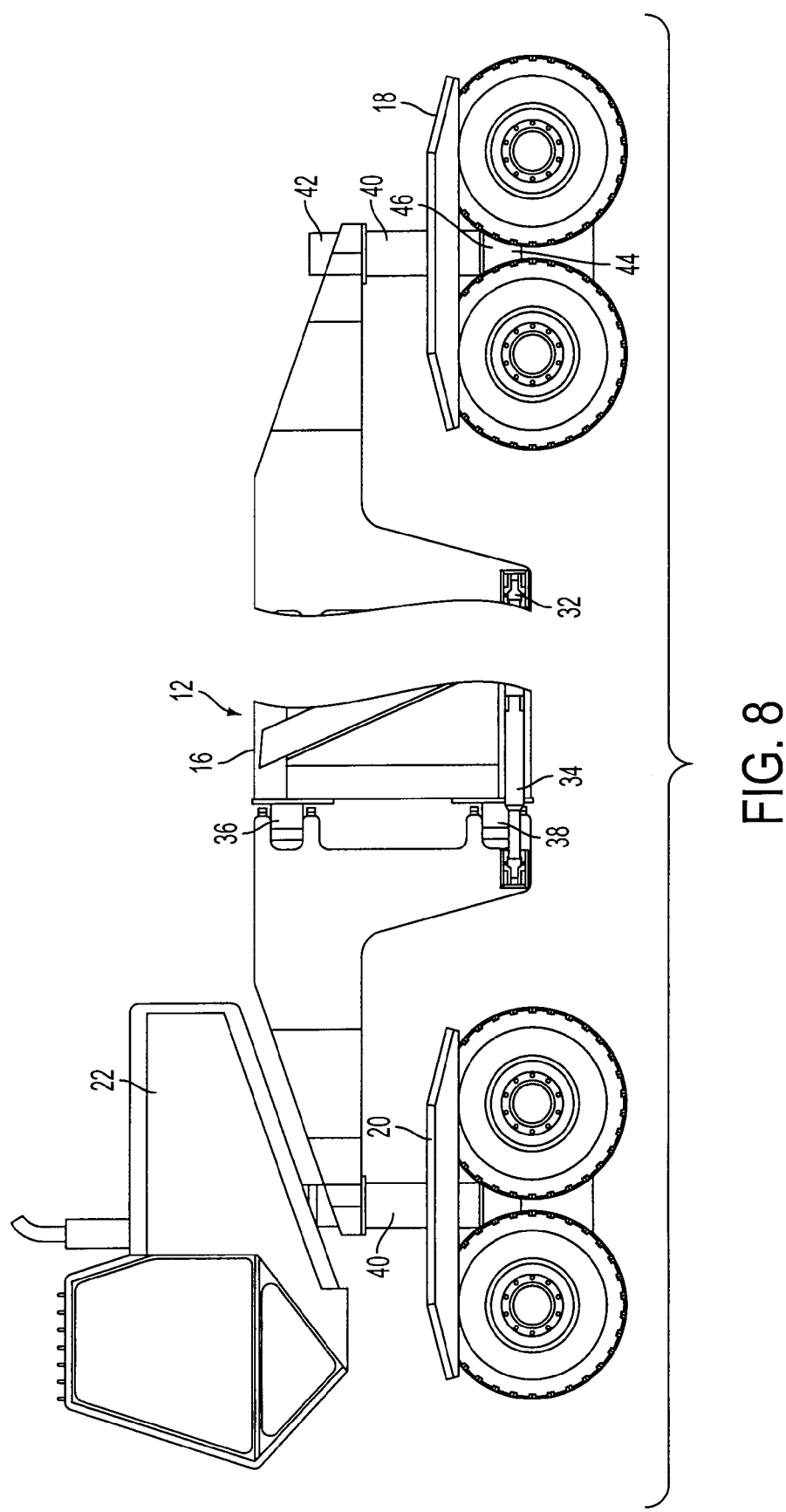
FIG. 8 is an enlarged partial side view of the vehicle of FIG. 6.

As shown in FIGS. 6-8, truss 16 has a first end 24 and a second end 26, each of which is hingedly coupled to a yoke or connecting arm 28 and 30, respectively. Each yoke 28 and 30 can be independently adjusted using two hydraulic pistons or actuators 32 and 34, respectively. Preferably, each yoke is coupled to the truss using a first hinge 36 and a second hinge 38, but may be coupled to the truss in any suitable manner. Preferably, the hinges allow the yoke to swing through an arc that is substantially parallel to the ground. The yoke extends to a respective bogie and connects to one end of hydraulic ram 40. The yoke is coupled to the first end 42 of the hydraulic ram 40. Hydraulic rams 40 are preferably 8 inches in diameter and produce up to 400,000 pounds of total lifting capacity on a 30 inch stroke; however, rams 40 can be any suitable device or linkage with any desired configuration and lifting capacity.

Figure 12:
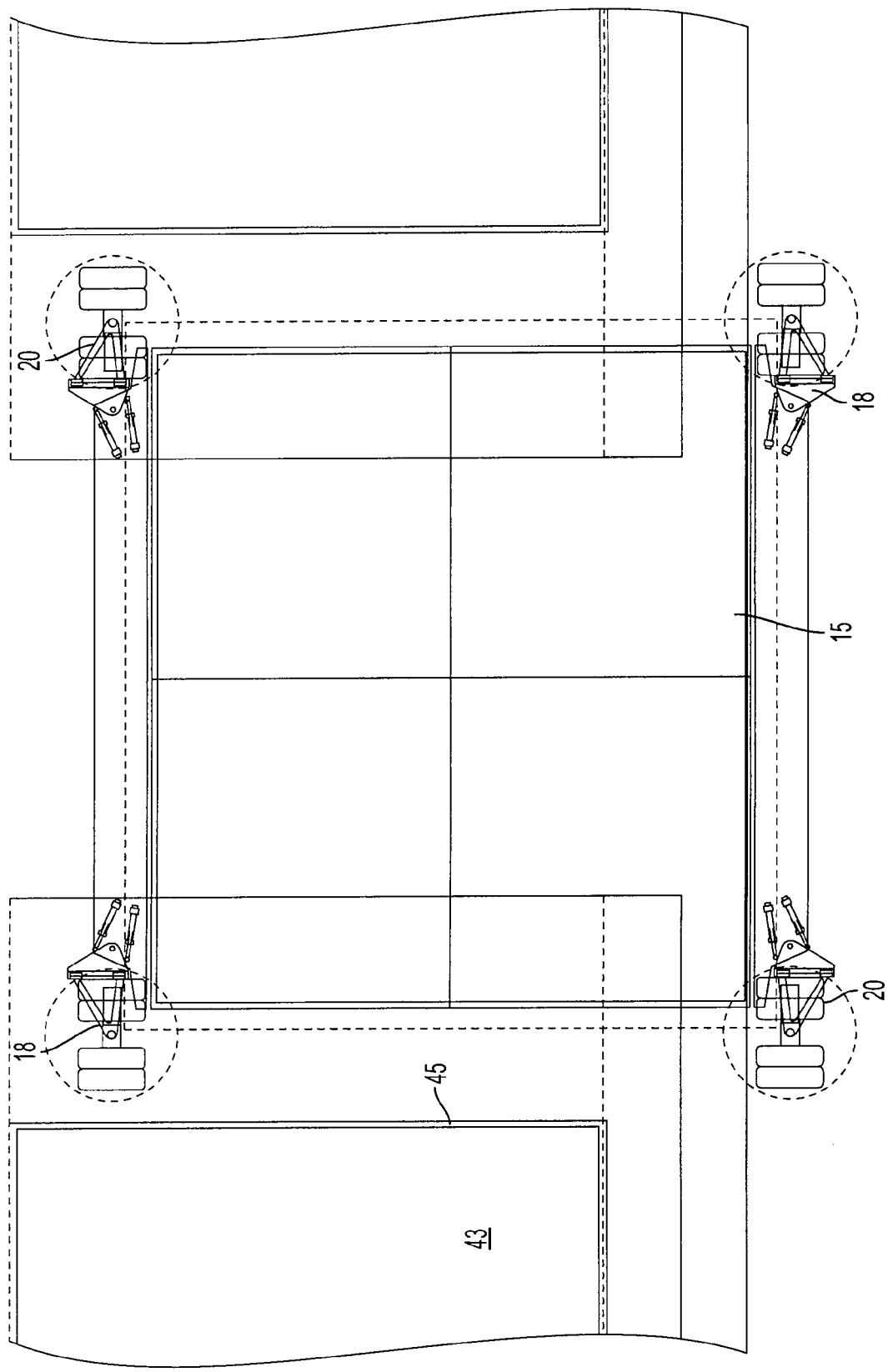
FIG. 12 is a schematic top view representation of the vehicle of FIG. 2 transporting a building to a predetermined site.
Figure 13:
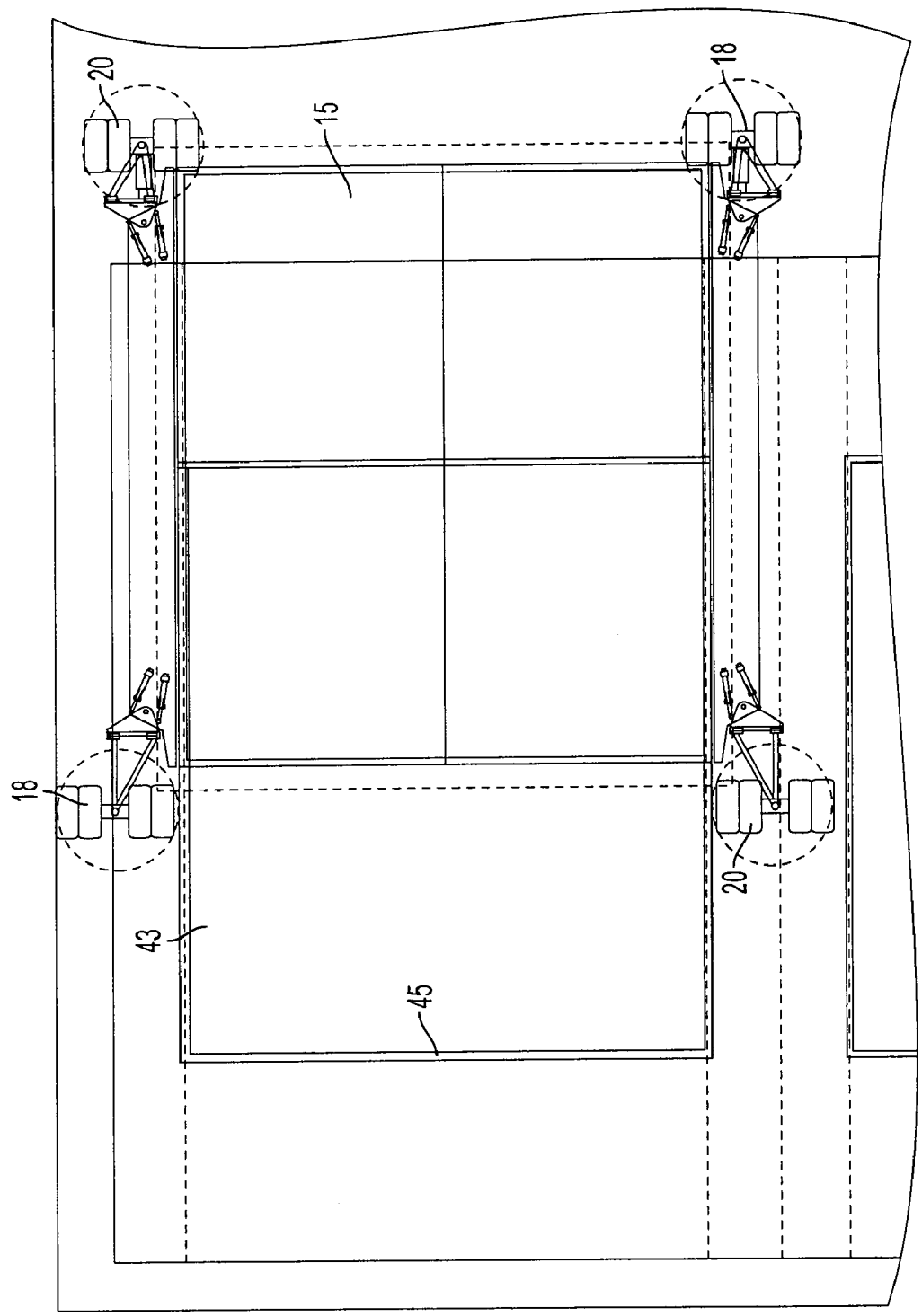
FIG. 13 is a schematic top view representation of the vehicle of FIG. 12 pulling into the predetermined site.

The yoke or connecting arm has a range of 120 degrees (or any suitable degree) of angular motion and as stated above is driven or controlled by the two opposing hydraulic pistons or actuators 32 and 34. The yoke preferably enables the wheel track of a specific vehicle to vary from about 40 feet to about 55 feet, but can allow the wheel track to vary in any suitable amount. While transporting the house to a particular or predetermined site 43 or operating in "cruise mode", the bogies are preferably "tucked in" to their narrow most position, so that the wheels can run on the roadways, as shown in FIG. 12. However, it is noted that the bogies can operate in any position desired or suitable during any of the step of transporting or positioning the building or house. During the pull-in maneuver to position the house at the predetermined site 43, the leading bogies preferably splay out to clear the house foundation 45, as shown in FIG. 13.

Additionally, the yoke allows for final positioning of the house over the foundation 45 in "set mode". Through coordinated movement of the articulated yokes, along with movement in a straight line of the bogies along the side edges of the foundation, the transport device 10 achieves sufficient latitudinal, longitudinal, and rotation movement over a small range to allow the operators to precisely align the house with its foundation.

Each bogie has a hydraulic ram with a first end 42 and a second end 44 coupled thereto. The first end is coupled to the connecting arm and the second end is coupled to a ball joint 46, which is in turn connected to the bogie itself. The ball joints 46 enable each ram to equalize the load over and negotiate uneven terrain.

Figure 11:
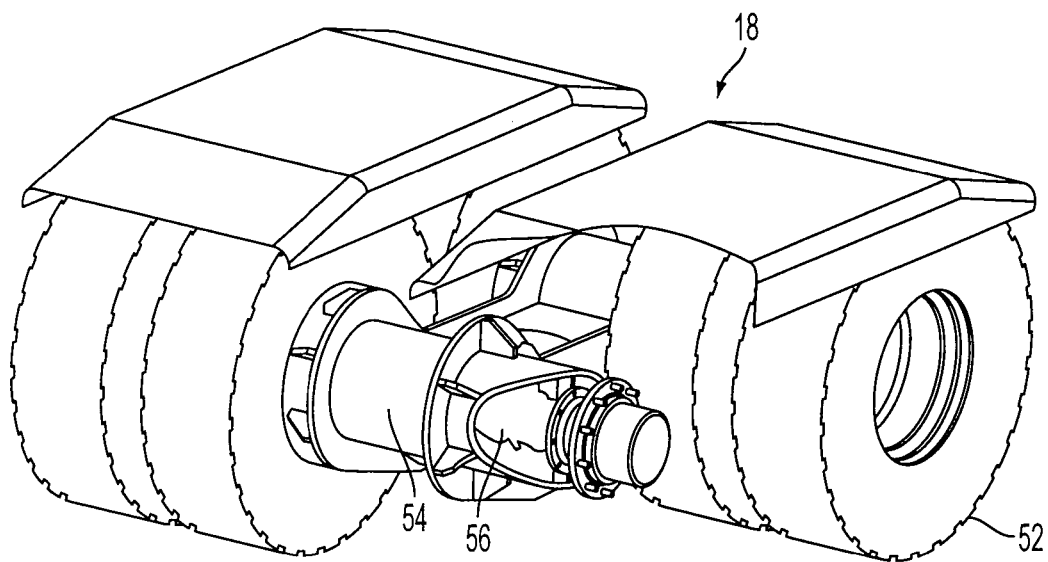
FIG. 11 is a top perspective view in section of an axel of one of the bogies for the vehicle shown in FIG. 6.

Each bogie preferably has eight wheels 52, as shown in FIG. 11 but can have any number of suitable wheels. For example, each bogie can have two wheels, four wheels or any number of wheels that would allow vehicle 12 to operate independently of vehicle 14.

Preferably each independent vehicle has two bogies and therefore when combined, the transport vehicle has four bogies, one at each corner; but it is noted that each independent vehicle can have any number of suitable bogies. Preferably, each bogie has eight driven wheels; but can have any number of suitably driven wheels (e.g. each bogie can have 1, 2 or more driven wheels). Four wheels are on an axle 54 with each wheel being driven by a separate hydraulic motor 56, but they can be driven in any suitable manner. The transport vehicle velocity and steering is controlled by independently controlling the velocity of the wheels on the left and right side of the bogie (known as differential steering). By driving and steering the four independent bogies, the velocity and heading of the vehicle as a whole can be precisely controlled.

In each mode of operation, the desired heading and velocity is calculated at each moment based on inputs from the operators and the onboard guidance and navigation systems. To achieve the desired position, differential steering of each bogie is used to advance and rotate the vehicle as required. To minimize stresses on the vehicle and the payload, algorithms can used to calculate an "instant center" about which to rotate the vehicle. However, it is noted that it is not necessary to steer the vehicle 10 in this manner and the vehicle can be merely steered by the operator or operators or computer control or other suitable means. This "instant center" may be under the vehicle or some distance away, based on the desired movement of the vehicle 10. At each moment, the four bogies are driven to align such that their axial direction of travel is perpendicular to a radial line drawn from the instant center to the bogie center.

One end of each independent vehicle has a driver's cabin 22 situated over the bogie and is configured to rotate in any suitable manner. For example, each cabin can rotate up to and including 360 degrees. Preferably, the driver's cabin is situated to be a high visibility air conditioned station that allows the driver to control the independent vehicle; however, the driver's cabin can be any suitable steering platform and can be positioned in any suitable area of the vehicle. Additionally, it is not necessary for each vehicle 12 and 14 to have a driver's cabin or steering ability and only one of the vehicles can be equipped with such capabilities.

Figure 3:
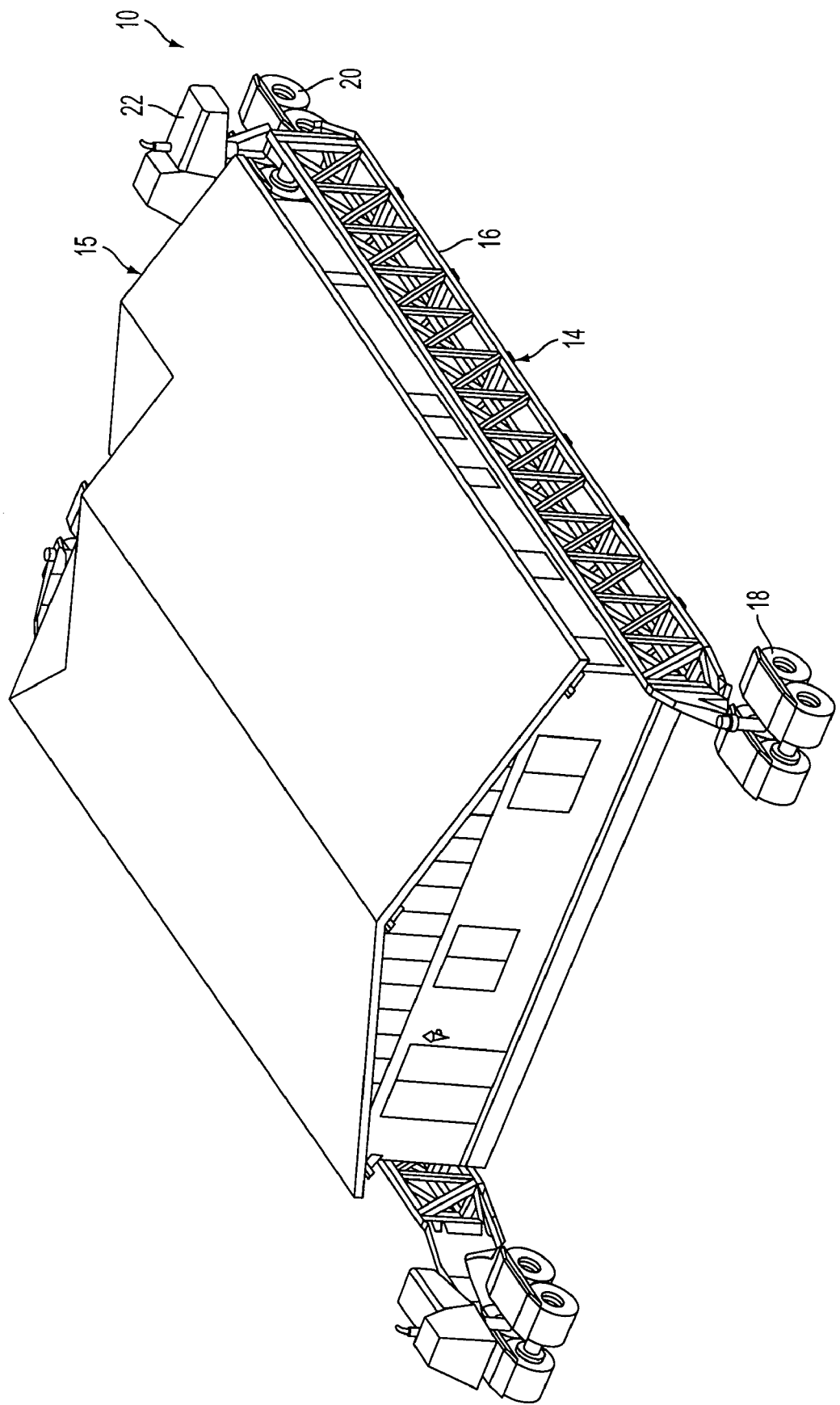
FIG. 3 is a top perspective view of the vehicles of FIG. 1 connected together with a building positioned therebetween.

FIG. 3 illustrates "load mode" for the transport vehicle 10. In "load mode", independent vehicles 12 and 14 couple together using beams 50 of house 15. Beams 50 are preferably formed from steel, but can be any suitable material or composition of materials. As shown in FIGS. 9 and 10, each beam 50 has a first end 60 and a second end 62. Each end of the beam has two conical sockets 64 that accept matching conical hollow pegs on the bottom of the trusses 16. The joint is preferably secured with coaxial bolts. It is noted that the beams can be connected to the trusses in any suitable manner. Additionally, the beams 50 can be integral with the structure of the building or separate to the structure of the building. Thus, when loading the vehicles 12 and 14 with the house, the house can be merely positioned on the beams 50, connected or coupled thereto in a suitable manner or integrally joined with the beams 50. The beams can be a structural component or the building or not.

Fine positioning of each independent vehicle preferably occurs under the control of an operator in the cab and one at a remote pendant that can be positioned in any suitable manner, such as outside of the cab or remote from the cab. One independent vehicle is positioned such that its cab is at the back of the building and the other such that its cab is at the front or in any other suitable manner. Once the two independent vehicles are precisely located, the payload is attached. Two inter-connect cables between the two independent vehicles are preferably connected, one at the front of the building and one at the back, so that the vehicles can operate as one unit in a master-slave arrangement. However, it is noted that the vehicles can couple in any suitable manner and do not necessarily need to be electrically coupled in this manner or approach and position themselves in this manner. The herein described "load mode" is merely exemplary (as is each herein described "mode") and the vehicles can be loaded and connected in any suitable manner.

With the house loaded, one independent vehicle is selected as the master and the other as the slave using a selection switch on each console or any in other suitable manner. While operating in "cruise mode", the cab at the front is typically the master and the one at the rear is the slave. When entering "cruise mode", an onboard computer system confirms that the two inter-connect cables are attached and that one cab is set as master and one is set as slave. The onboard computer system also confirms that all load sensors are within nominal range and that the house is level within tolerance. At this point, the master cab operator can begin moving the vehicle.

As vehicle 10 pulls away, generally, all four yokes are folded in to their fully retracted position (so that the overall wheel track is narrow enough to fit on the roads), as shown in FIG. 12. FIG. 12 is merely a schematic drawing of the bogies and is not a full drawing of each independent vehicle, including the trusses and cabs. This figure is merely for exemplary purposes of the "cruise mode" and is not meant to limit the structure of the herein described vehicle. Folding to this position can be achieved by means of a switch on the console or by any other suitable means. At this point, as the vehicle drives forward, the yokes fold in automatically. However, as noted above, the bogies can be positioned in any desired or suitable position at any time during loading, setting or transporting the building or house 15.

While driving, two operators, one in each cab, preferably control the vehicle's motion while communicating to each other over headsets; however it is not necessary for the operators to communicate in the manner, to communicate at all or for there even to be two operators. The vehicle can operate with any suitable number of operators and/or the operators can be positioned remotely from the vehicle and communicate with the vehicle from wired or wireless means or the vehicles can be computer controlled or automated. From each of the operators' points of view, each feels as if they are driving their own corner of the vehicle via a joystick on the console (not shown). The onboard computer system achieves such operation by generating steering commands for all four bogies based on the input of the two joysticks. In this way, the operators can navigate fairly tight corners. The overall velocity is governed primarily by the master (front) operator. Both operators must maintain pressure on a dead-man enable switch (not shown) to enable motion.

Preferably, the house is maintained in a level position throughout its conveyance to a predetermined position or location. Sensors or other suitable means monitor the angle of the house with respect to a gravity vector while other sensors or means measure the pitch angle induced on the bogies due to the slope of the ground. Based on this input, the onboard computer system causes the leveling jacks at each bogie to adjust accordingly to maintain level. In all modes, this leveling action supersedes the travel velocity in so far as the onboard computer system will automatically slow down the wheels to accommodate the leveling response time as necessary. If the system should ever reach the threshold where proper leveling cannot be maintained, the onboard computer system can invoke an Automatic Stop, bringing forward travel to a halt at a suitable speed or deceleration.

Using "cruise mode", the vehicle is brought to the vicinity of the foundation 45 onto which the building or house will be placed. Depending on the exact geometry of the final location, the operators will have a specific target range of position and orientation to park the vehicle 10 before switching over to "pull in" mode. The onboard display preferably will indicate when the vehicle is within the proper range based on GPS readings by onboard receivers or by any other suitable method or device.

As shown in FIG. 13, "pull-in mode" begins with a laser beacon (not shown) or any other suitable device or method being placed on a survey point at the back of the foundation or in other suitable position, as a precise reference point. FIG. 13 is merely a schematic drawing of the bogies and is not a full drawing of each independent vehicle, including the trusses and cabs. This figure is merely for exemplary purposes of the "pull-in mode" and is not meant to limit the structure of the herein described vehicle. When the system is switched into "pull-in mode", the onboard computer system checks to make sure that the vehicle is within the correct starting range using both the GPS receivers and two sensors receiving the rotating beam from the laser beacon. If all the inputs are consistent, the system will indicate that it is ready to begin the automated procedure of pulling in.

The operator then ensures that the path ahead is clear and initiates motion by means of a pushbutton. The vehicle then begins moving at a "creep speed", which it will maintain throughout the pull in procedure. The operators can have the capability to slightly adjust the motion by way of their joysticks and both must keep pressure on their respective dead-man enable switches.

The onboard computer system automatically drives the vehicle to a precise location and orientation. As the vehicle automatically maneuvers to the known point, the system splays out the two front yokes to their widest position to fit outside the foundation. When the vehicle reaches the front of the foundation, it will stop and allow the operators to confirm the location visually.

Preferably, the splay of the lead bogie occurs during pull-in and the rear outer-most bogie remains in full tuck position; however, each or all of the bogies can be positioned in any suitable position and are not limited to the specific positions described herein.

If both operators are satisfied with the starting position, they re-enable motion through the console or in any other suitable manner. During the second step, the vehicle drives in over the foundation while rotating the house to its correct orientation. This maneuver is preferably pre-programmed and customized for the particular location and associated obstacles; but may be performed in any suitable manner. It generally involves coordinated motion of the bogies and the yokes throughout the motion. Preferably, the operators continue to have fine adjustment capability and continuously enable the motion. The automatically leveling system continues to be active throughout this maneuver. Additionally, fine adjustments could be made with yokes, but lateral movement of the bogies occurs over a distance unless the vehicle stops and the bogie rotates in place to be perpendicular to yoke, then drives the yoke to the desired position and returns to point according to the on board computer system for resumed automatic maneuver. It is noted that it is not necessary for the system to work in this specific manner and any portion or all of these maneuvers can be automatic, computer controlled, manually controlled, any combination thereof or in any other desired manner.

The onboard computer system automatically stops the vehicle when it is within a specific range of the final position as detected by laser and GPS positioning system or any other suitable device or method, thus ending the "pull-in" procedure.

Figure 14:
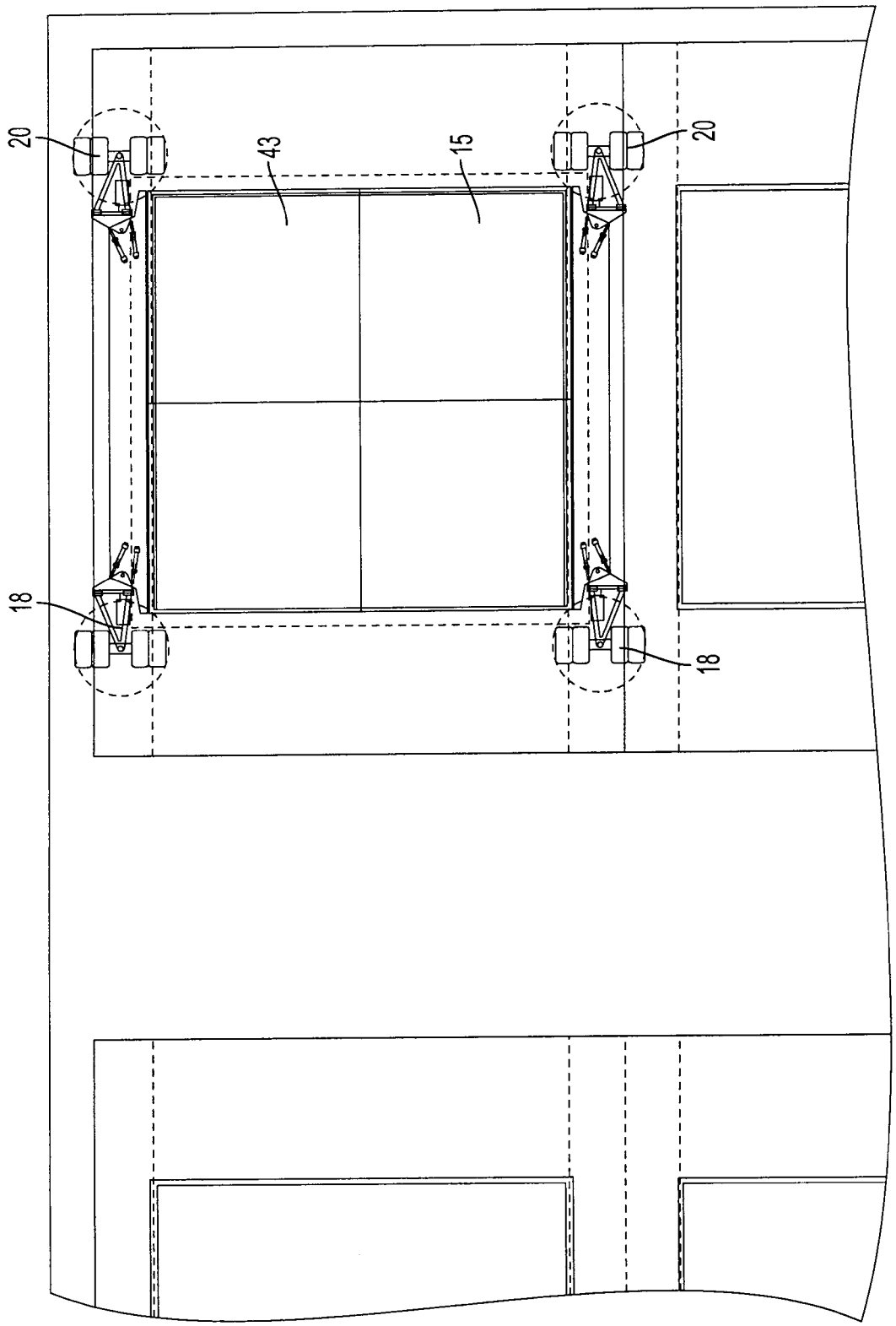
FIG. 14 is a schematic top view representation of the vehicle of FIG. 13 positioning the building over an existing foundation.

Final positioning of the house on the foundation is accomplished in "set mode", as shown in FIGS. 14-16. FIGS. 14-16 are merely schematic drawings of the bogies and are not full drawings of each independent vehicle, including the trusses and cabs. These figures are merely for exemplary purposes of the "set mode" and are not meant to limit the structure of the herein described vehicle. In this mode the operators control can use any suitable method. For example, remote pendants can be attached to the outside of each cab, thus allowing the operators a better perspective for setting the house. Using a joy stick and rotary knob, for example, the operators can translate the house over a small range (e.g. an order of magnitude of approximately two feet) in any direction and rotate the house about its vertical axis up to +/− approximately 5 degrees. However, it is noted that the controls can be inside the cab, wireless or wired remote controls or any other suitable controls and the variance of movement both laterally and vertically can be any suitable distance or angle.

This motion is accomplished by the onboard computer system commanding the motion of the four bogie yokes and secondarily the bogies themselves to drive straight backward and forward a short distance along the foundation. No bogie steering is necessarily required.

Once the house is positioned over the foundation, the operator commands the system to lower the house down slowly. Fine position and rotations can continue to be made during lowering until the house is placed precisely on its mark. At this point, the vehicle is shut off while the house is mechanically decoupled from the vehicle and the two vehicle-halves are disconnected mechanically and electrically.

"Extract mode" is used to remove the vehicles 12 and 14 from between two houses after placing a house on its foundation. Because of the narrow space, this maneuver is accomplished by guiding both the front and rear bogie out under manual control. One bogie is controlled by the joystick in the cab while the other is controlled by an operator walking along side with a pendant. Due to the nature of the combined vehicle, one vehicle must be extracted cab first and the other tail first. Once the vehicles become clear of the foundations, they can be steered onto the roadway. When they are completely clear, the pendant is stowed and the vehicle is switched to Go-Home mode for the drive back to the factory. Automatic leveling is not active in "extract mode", but the operator has the ability to manually raise or lower each end as required and/or desired. The herein described "extract mode" is merely exemplary and the vehicles do not necessarily need to perform each step as described herein or perform each step in the same manner as described. If the cross beams 50 are not integral with the house, they must be extracted laterally from the foundation using a small vehicle, such as a Bobcat. The beams are then transported out to the street in front of the house and loaded onto suitable brackets on the sides of each of the vehicles 12 and 14 or onto separate trucks as desired.

"Go-home mode" is used to drive each half-vehicle back to the factory or any other suitable location. In this mode, a single operator sits in the cab and essentially drives the vehicle using the joystick and the motion enable dead-man pedal. The onboard computer system will steer the vehicle in a natural-feeling fashion based on the operator's inputs. Automatic leveling is not active in this mode, but the operator has the ability to manually raise or lower each end as required and/or desired.

Since no leveling is required, the vehicle can travel up to its maximum speed of 10 MPH in this mode or any other suitable speed It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A transport device for transporting a load, comprising:
   a first self propelled vehicle having a first leveling device configured to support a first location of the load and a third leveling device configured to support a third location of the load;
   a first processor in communication with said first leveling device and said third leveling device;
   a second self propelled vehicle having a second leveling device configured to support a second location of the load and a fourth leveling device configured to support a fourth location of the load;
   a second processor in communication with said second leveling device and said fourth leveling device; and
   wherein said first and second processors are configured to communicate with each other and monitor the distribution of the load at the first location, second location, third location and fourth location and automatically and continually adjust the first, second, third and fourth leveling devices to maintain the load at a predetermined coplanar position during transport of the load through the entire transport process from load acquisition to load delivery.

2. A transport device according to claim 1, further comprising
   a plurality of hydraulic rams coupled to at least one of said first and second self propelled vehicles.

3. A transport device according to claim 2, further comprising
   a ball and socket arrangement coupled to each of said plurality of hydraulic rams.

4. A transport device according to claim 1, wherein
   said first and second self propelled vehicles are configured to couple together such that systems of the second self propelled vehicle can be controlled by an operator of said first self propelled vehicle.

5. A transport device according to claim 1, wherein
   said first and second self propelled vehicles are configured to couple together using structure that is integrated into said load.

6. A transport device according to claim 1, wherein
   said first and second electrical systems are configured to communicate, allowing the first and second self propelled vehicles to form a combined vehicle capable of automatically adjusting and maintaining a predetermined position of the load during transport over uneven terrain and capable of directional control from an operator positioned on only one the first and second self propelled vehicles.

7. A transport device according to claim 1, wherein
   the load is a full sized house.

8. A transport device for transporting a load, comprising:
   a first self propelled transport vehicle, said first self propelled transport vehicle having at least two wheels capable of individual rotation about a vertical axis, each of said wheels driven by a motor;
   a leveling means;
   a second self propelled transport vehicle, said second self propelled transport vehicle having at least two wheels capable of individual rotation about a vertical axis, each of said wheels driven by a motor; and
   at least one electrical system positioned in at least one of the first and second self propelled vehicles configured to monitor the distribution of the load and automatically adjust the leveling means to maintain the load at a predetermined coplanar position during transport of the load;
   wherein said first self propelled transport vehicle and said second self propelled transport vehicle are configured to couple together and communicate such that said load is supported and capable of being transported and automatically and continually adjusted by the leveling means to maintain a coplanar position during transport of the load through the entire transport process from load acquisition to load delivery;

wherein said at least two wheels of said first self propelled transport vehicle and said at least two wheels of said second self propelled transport vehicle are coupled to a respective self propelled transport vehicle, such that the transport device is capable of altering its overall wheel track width.

9. A transport device according to claim 8, wherein
said communication between said first self propelled transport vehicle and said second self propelled transport vehicle allows said first self propelled transport vehicle to control said second self propelled transport vehicle.

10. A transport device according to claim 8, further comprising
a plurality of hydraulic rams coupled to at least one of said first and second support structures.

11. A transport device according to claim 10, further comprising a ball and socket arrangement coupled to each of said plurality of hydraulic rams.

12. A transport device according to claim 8, wherein
said at least one electrical system is electrically connected to a plurality of pressure sensors to determine the weight distribution of said load.

13. A transport device according to claim 8, wherein
the at least one electrical system includes a first electrical system located in the first transport vehicle and a second electrical system located in the second transport vehicle, the first and second electrical systems configured to communicate, allowing the first and second transport vehicles to form a combined vehicle capable of automatically adjusting and maintaining a predetermined position of the load during transport over uneven terrain and capable of directional control from an operator positioned on only one the first and second self propelled vehicles.

14. A method of transporting a load, comprising the steps of
coupling said load to a first transport vehicle and a second transport vehicle to form a load transport vehicle, such that said load is positioned at least partially between said first transport vehicle and said second transport vehicle;
moving said load to a desired location;
monitoring the distribution of the load using a sensor and at least one electrical system in communication with the sensor, the at least one electrical system positioned in at least one of the first and second transport vehicles;
automatically and continually adjusting the position of said load using a leveling means configured to maintain the load at a predetermined position during transport of the load during transport of the load through the entire transport process from load acquisition to load delivery based on information received from the sensor through the at least one electrical system;
altering the overall wheel track width of the load transport vehicle, such that the load transport vehicle can accommodate varying width terrain;
positioning said load over said desired location;
lowering said load to said desired location; and
decoupling said load from said first transport vehicle and said second transport vehicle.

15. A method according to claim 14, wherein
the at least one electrical system includes a first electrical system located in the first transport vehicle and a second electrical system located in the second transport vehicle; and
said step of coupling said load to a first transport vehicle and a second transport vehicle includes electrically coupling said first electrical system to said second electrical system.

16. A method according to claim 15, wherein
said electrically coupling said first electrical system to said second electrical system allows said first transport vehicle to control said second transport vehicle.

17. A method according to claim 15, wherein
the step of coupling includes electrically coupling a first electrical system located in first transport vehicle to a second electrical system located in second transport vehicle, such that the first and second transport vehicles to form a combined vehicle capable of automatically adjusting and maintaining a predetermined position of the load during transport over uneven terrain and capable of directional control from an operator positioned on only one the first and second self propelled vehicles.

18. A method according to claim 14, wherein
said step of coupling said load to a first transport vehicle and a second transport vehicle includes coupling said load to said vehicles using beams that are integrated into said load.

19. A method according to claim 14, wherein
said step of coupling said load to a first transport vehicle and a second transport vehicle includes coupling said load to said vehicles using beams that are separable from said load.

20. A transport device for transporting a load, comprising:
a first self propelled vehicle, the first self propelled vehicle including a first leveling device, the first leveling device being configured to support a first portion of a load, the first leveling device being coupled to a first location of the load, the first self propelled vehicle including a second leveling device, the second leveling device being configured to support a second portion of the load, the second leveling device being coupled to a second location of the load;
first electrical circuitry in communication with the first leveling device and the second leveling device;
a second self propelled vehicle, the second self propelled vehicle including a third leveling device, the third leveling device being configured to support a third portion of the load, the third leveling device being coupled to a third location of the load, the second self propelled vehicle including a fourth leveling device, the fourth leveling device being configured to support a fourth portion of the load, the fourth leveling device being coupled to a fourth location of the load;
second electrical circuitry in communication with the third leveling device and the fourth leveling device;
a computer control in communication with the first and second electrical circuitry and configured to monitor the distribution of the load and automatically and continually adjust the first, second, third and fourth leveling devices to maintain the load at a predetermined coplanar position during transport of the load through the entire transport process from load acquisition to load delivery and automatically decrease a travel velocity of the first or second self propelled vehicle if it is determined that the first, second, third or fourth leveling devices are unable to maintain the load at the predetermined coplanar position at the travel velocity.

21. A transport vehicle for transporting a building, comprising:
- a first self propelled vehicle having a first end with a first leveling device configured to support a first location of the building and a second end with a second leveling device configured to support a second location of the building;
- a first processor in communication with said first leveling device and said second leveling device;
- a first wheeled bogie coupled to the first end of the first self propelled vehicle by a first arm, the first arm having a first end and a second end, the first end of the first arm connected to the first wheeled bogie such that the first wheeled bogie can rotate about a vertical axis and the second end of the first arm connected to the first end of the first self propelled vehicle such that the first wheeled bogie can rotate at least partially around the first end of the first propelled vehicle, the first wheeled bogie including a first wheel and a second wheel capable of rotating in opposite directions;
- a second wheeled bogie coupled to the second end of the first self propelled vehicle by a second arm, the second arm having a first end and a second end, the first end of the second arm connected to the second wheeled bogie such that the second wheeled bogie can rotate about a vertical axis and the second end of the second arm connected to the second end of the first self propelled vehicle such that the second wheeled bogie can rotate at least partially around the second end of the first propelled vehicle, the second wheeled bogie including a first wheel and a second wheel capable of rotating in opposite directions;
- a second self propelled vehicle having a third leveling device configured to support a third location of the building and a fourth leveling device configured to support a fourth location of the building;
- a second processor in communication with said third leveling device and said fourth leveling device;
- a third wheeled bogie coupled to the first end of the second self propelled vehicle by a third arm, the third arm having a first end and a second end, the first end of the third arm connected to the third wheeled bogie such that the third wheeled bogie can rotate about a vertical axis and the second end of the second arm connected to the first end of the second self propelled vehicle such that the third wheeled bogie can rotate at least partially around the first end of the second propelled vehicle, the third wheeled bogie including a first wheel and a second wheel capable of rotating in opposite directions;
- a fourth wheeled bogie coupled to the second end of the second self propelled vehicle by a fourth arm, the fourth arm having a first end and a second end, the first end of the fourth arm connected to the fourth wheeled bogie such that the fourth wheeled bogie can rotate about a vertical axis and the second end of the fourth arm connected to the second end of the second self propelled vehicle such that the fourth wheeled bogie can rotate at least partially around the second end of the second propelled vehicle, the fourth wheeled bogie including a first wheel and a second wheel capable of rotating in opposite directions; and
- wherein said first and second processors are configured to communicate with each other and monitor the distribution of the building at the first location, second location, third location and fourth location and automatically and continually adjust the first, second, third and fourth leveling devices to maintain the building at a predetermined coplanar position during transport of the building through the entire transport process from building acquisition to delivery and automatically decrease a travel velocity of the first or second self propelled vehicle if it is determined that the first, second, third or fourth leveling devices are unable to maintain the building at the predetermined coplanar position at the travel velocity;
- the computer control further configured to control the position of the first, second, third and fourth bogies, such that distance between the first bogie and third bogie can be altered and the distance between the second bogie and fourth bogie can be altered.

* * * * *